(No Model.)

E. G. MEDRICK.
STUFFING BOX.

No. 369,869. Patented Sept. 13, 1887.

WITNESSES:
Chas. Nida
C. Sedgwick

INVENTOR:
E. G. Medrick
BY Munn & Co
ATTORNEYS.

UNITED STATES PATENT OFFICE.

ERASTUS G. MEDRICK, OF MIDDLETOWN, NEW YORK.

STUFFING-BOX.

SPECIFICATION forming part of Letters Patent No. 369,869, dated September 13, 1887.

Application filed February 2, 1887. Serial No. 226,278. (No model.)

*To all whom it may concern:*

Be it known that I, ERASTUS G. MEDRICK, of Middletown, in the county of Orange and State of New York, have invented a new and Improved Stuffing-Box, of which the following is a full, clear, and exact description.

The object of my invention is to provide a new and improved stuffing-box specially adapted for steam-cylinders and steam-chests, which is simple and durable in construction and very effective in operation.

The invention consists, mainly, of a piston fitting steam-tight, but adapted to slide in the gland of the stuffing-box and pressing against the wedge-shaped metallic packing-rings in the gland.

The invention also consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
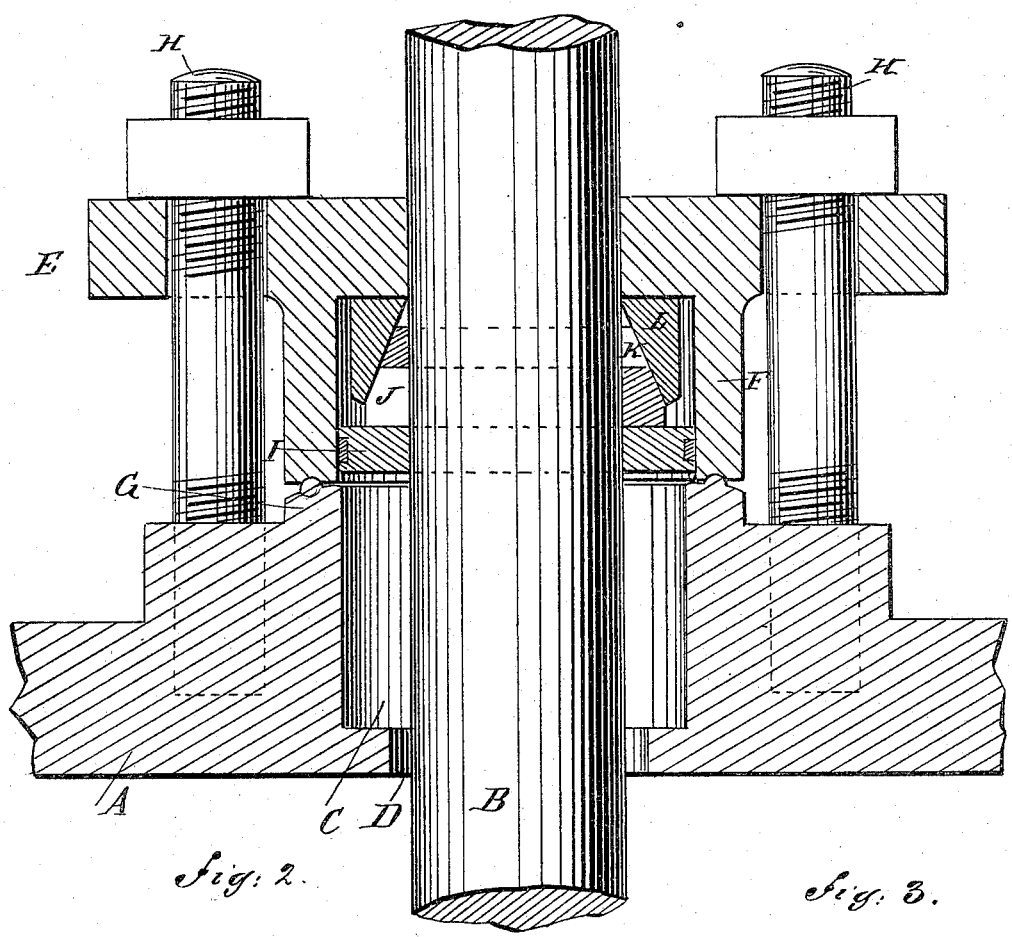
Figure 2:
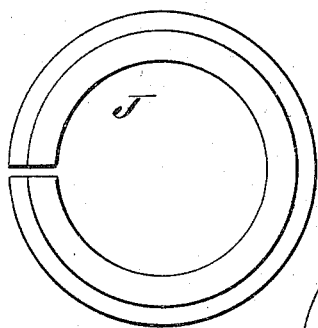
Figure 3:
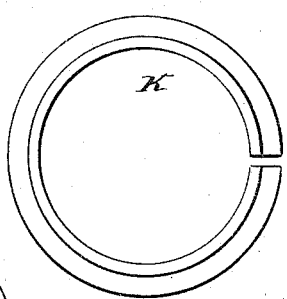
Figure 4:
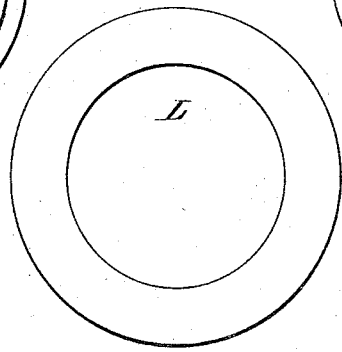

Figure 1 is a central sectional view of my improvement attached to a steam-cylinder head. Figs. 2, 3, and 4 are face views of the several packing-rings.

Through the steam-cylinder head A passes the piston-rod B, and a recess, C, is formed in the said cylinder-head A, which is open at its outer end and connects at its inner end, by means of the aperture or apertures D, with the interior of the cylinder.

The gland E is provided with a cylinder, F, the inner edge of which rests on the projection G, formed on the cylinder-head A, and the said cylinder corresponds in size to the recess C in the cylinder-head A. The gland E is held on the projection G by bolts H or other suitable means.

In the cylinder F of the gland E is placed a piston, I, provided with the usual packing-rings and operating against the metallic wedge-shaped split ring J, pressing against another similarly-shaped split ring, K, placed in front of the said ring J. The slits in the rings J and K are oppositely placed, so as to break joint. Both rings J and K are held in the internally cone-shaped ring L, the smaller opening of which fits over the piston-rod B, while its outer end rests against the gland E.

The inner end of the ring L is a suitable distance from the piston I, so as to permit the latter an outward motion when acted upon by the steam entering from the cylinder into the recess C by means of the aperture or apertures D.

It will be seen that when the steam from the cylinder presses against the piston I then the latter is forced outward and presses the wedge-shaped rings J and K in the same direction in the ring L, whereby the latter causes the said rings J and K to close tightly on the piston-rod B, on account of the conical shape of the said ring L and the wedge shape of the rings J and K. A very tight steam-joint is thus formed on the piston-rod B.

I am aware that in this particular class of inventions a constant pressure has been applied to the packing-rings by means of a spiral spring acting on an interposed disk, which was made of less diameter than the cylinder containing said parts, and thus allowed the free passage of steam around it. In my invention, the piston fitting steam-tight, the pressure on the packing-rings is not only exerted by the steam alone, but is always proportionate to the pressure of steam in the main cylinder.

Having thus fully described my invention, I claim as new and desire to secure by Letters Patent—

1. In a stuffing-box, the combination, with a gland, of a piston fitting steam-tight in the said gland and operated on by steam from the steam-compartment, wedge-shaped packing-rings held in the said gland and operated on by the said piston, and a ring surrounding the said wedge-shaped packing-rings, substantially as shown and described.

2. In a stuffing-box, the combination, with the gland having a cylinder, of a piston fitting steam-tight, adapted to slide in the said cylinder, metallic wedge-shaped split packing-rings, against which presses the said piston, and an internally cone-shaped ring inclosing the said wedge-shaped packing-rings, substantially as shown and described.

ERASTUS G. MEDRICK.

Witnesses:
F. D. YOUNGBLOOD,
S. ALBERT BULL.